United States Patent
Chen

(10) Patent No.: US 8,127,129 B2
(45) Date of Patent: Feb. 28, 2012

(54) METHOD AND NETWORK SYSTEM FOR NEGOTIATING A SECURITY CAPABILITY BETWEEN A PCC AND A PCE

(75) Inventor: Guoyi Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 466 days.

(21) Appl. No.: 12/437,847

(22) Filed: May 8, 2009

(65) Prior Publication Data

US 2009/0217347 A1 Aug. 27, 2009

Related U.S. Application Data

(63) Continuation of application No. PCT/CN2008/070781, filed on Apr. 23, 2008.

(30) Foreign Application Priority Data

Jun. 27, 2007 (CN) .......................... 2007 1 0112676

(51) Int. Cl.
*H04L 9/00* (2006.01)
(52) U.S. Cl. ........ 713/150; 713/151; 713/152; 713/153; 726/1; 709/220; 709/221; 709/222; 709/223; 709/224; 709/225; 709/226; 370/230; 370/254; 370/390
(58) Field of Classification Search .......... 713/150–153; 726/1; 709/220–226; 370/230, 254, 390
See application file for complete search history.

(56) References Cited

U.S. PATENT DOCUMENTS

| 6,983,325 | B1 | 1/2006 | Watson et al. |
| 7,701,940 | B2 * | 4/2010 | Novello et al. ................ 370/390 |
| 7,710,872 | B2 * | 5/2010 | Vasseur ......................... 370/230 |
| 2006/0098587 | A1 * | 5/2006 | Vasseur et al. ................ 370/254 |
| 2006/0098657 | A1 | 5/2006 | Vasseur et al. |

FOREIGN PATENT DOCUMENTS

| CN | 1790982 A | 6/2006 |
| CN | 1949744 A | 4/2007 |
| WO | WO 2006/052672 A2 | 5/2006 |

OTHER PUBLICATIONS

Vasseur, et al., Networking Working Group Internet Draft, entitled "Path Computation Element (PCE) Communication Protocol (PCEP) (draft-ietf-pce-pcep-07.txt)," Mar. 2007, pp. 1-65.*

(Continued)

*Primary Examiner* — Yin-Chen Shaw
(74) *Attorney, Agent, or Firm* — Leydig, Voit & Mayer, Ltd.

(57) ABSTRACT

A method and a network system for negotiating a security capability between a path computation client (PCC) and a path computation element (PCE) are described. The method includes the steps as follows. The PCE sends a packet carrying security policy capability information to the PCC. After receiving the packet, the PCC acquires a security policy capability supported or required by the PCE or a security policy capability supported by both of the PCE and the PCC. In various embodiments of the present invention, negotiation of PCC-PCE and PCC-PCC may be performed by sending the packet carrying the security policy capability information, thereby greatly simplifying the security policy configuration between PCC-PCE and PCE-PCE, and simplifying the complexity in PCE deployment.

12 Claims, 3 Drawing Sheets

OTHER PUBLICATIONS

Written Opinion of the International Searching Authority in corresponding PCT Application No. PCT/CN2008/070781 (Jul. 31, 2008).

Vasseur et al., "Path Computation Element (PCE) communication Protocol (PCEP) draft ietf pce pcep 06.txt," Feb. 13, 2007, Internet Engineering Task Force Trust.

Le Roux et al., "OSPF protocol extensions for Path Computation Element (PCE) Discovery draft ietf pce disco proto ospf 02.txt," Feb. 2007, Internet Engineering Task Force Trust.

Le Roux et al., "IS IS protocol extensions for Path Computation Element (PCE) Discovery draft ietf pce disco proto isis 02.txt," Internet Engineering Task Force Trust.

* cited by examiner

METHOD AND NETWORK SYSTEM FOR NEGOTIATING A SECURITY CAPABILITY BETWEEN A PCC AND A PCE

CROSS-REFERENCE TO RELATED APPLICATIONS

This application is a continuation of International Patent Application No. PCT/CN2008/070781, filed Apr. 23, 2008, which claims priority to Chinese Patent Application No. 200710112676.X, filed Jun. 27, 2007, both of which are hereby incorporated by reference in their entirety.

FIELD OF THE TECHNOLOGY

The present invention relates to communication technology, and more particularly to a method and a network system for negotiating a security capability between a path computation client (PCC) and a path computation element (PCE) in a traffic engineering (TE) path computation of a communication system.

BACKGROUND

The process of mapping the communication traffic on the network physical topology structure and the resource location for the communication traffic are called the TE.

Recently, PCE is a new model adapted to compute the TE path. As compared with a conventional manner of implementing the TE path computation by routers, in the TE path computation model based on the PCE, a path computation function is separated and is implemented by the PCE. All nodes which need to establish a traffic engineering label switched path (TE-LSP) serving as the PCCs request the path computation from the PCE. After implementing the path computation according to the path computation requirement, the PCE returns corresponding results to the PCC nodes, and the PCC nodes establish the corresponding TE-LSPs according to the computation result.

The PCC and the PCE are of typical client/server (C/S) model, and before sending a path computation request to the PCE, the PCC needs to know where the PCE is.

Path Computation Element Discovery (PCED) is a standard protocol adapted to implement automatic discovery of the PCE proposed by a PCE workgroup. The PCED extends the Open Short Path First (OSPF) protocol or the Intermediate System to Intermediate System (ISIS) protocol, the OSPF or the ISIS protocol floods the relevant information of the PCE in one routing domain, which is equivalent to broadcasting in the routing domain, and the routing domain may be a routing area or an autonomous system (AS). Thus the relevant information to the PCE information may be acquired by all the PCCs in the routing domain. The information includes location information of the PCE, the computation capability of the PCE, the function supported by the PCE, the computation scope of the PCE, the information about whether the load sharing is supported, and the information about whether the PCE is in a congestion state, etc.

One PCC may receive the information of a plurality of PCEs. The PCC selects one appropriate PCE as the default PCE for the path computation from the PCEs according to the received information of the PCEs. When the PCC needs to compute a TE path, the PCC sends a relevant path computation request to the default PCE, and the default PCE implements the TE path computation. The PCE implements the path computation and returns the relevant path computation result to the PCC, and the PCC establishes the corresponding TE path according to the path computation result.

The communication between the PCC and the PCE is implemented through a path computation element communication protocol (PCEP), the PCEP is a protocol adapted to perform the communication of PCC-PCE and PCE-PCE, and the PCEP adopts a transmission control protocol (TCP) as a transmission protocol. The PCEP bears various interaction packets between the PCC and the PCE, and the packets include packets of capability negotiation, various path computation request packets sent from the PCC to the PCE, a relevant path computation result sent from the PCE to the PCC, and various error packets delivered between the PCC and the PCE, etc.

Before the PCC sends the path computation request to the PCE, a PCEP connection between the PCC and the PCE need to be established. In the process of establishing the connection, firstly, a TCP connection between the PCC and the PCE is established, and then the relevant capability negotiation is performed. After the capability negotiation is finished, the PCEP connection between the PCC and the PCE is established. The capability negotiation between the PCC and the PCE includes a PCEP protocol version number, keep-alive time of the connection between the PCC and the PCE, and the maximum keep-alive time, etc.

Referring to FIG. 1, it is a schematic view of the TE path computation implemented together by a plurality of PCEs. A head end 101 serving as the PCC sends a computation request to a default PCE 102. The default PCE 102 performs the path computation according to the path computation request, and returns the path computation result to the head end 101. If the default PCE 102 cannot independently implement the path computation, the PCE 102 sends the path computation request to another PCE, for example, the PCE 103, so as to request the path computation assistance. Here, relative to the PCE 103, the PCE 102 becomes the PCC.

As described above, the information of the PCE is flooded in one routing domain through the OSPF or the ISIS, so that all the nodes in the routing domain may acquire the PCE information. And, the information may be spread to other routing domains through a certain mechanism. In this manner, many nodes, including authorized and unauthorized nodes, acquire the information of the PCE, and may get access to the PCE through the PCEP protocol. Therefore, some problems as follows are generated.

(1) The unauthorized node illegally intercepts the computation requests and the response packets delivered between the PCE and the PCE.

(2) The unauthorized node pretends to be the PCC or the PCE.

(3) The unauthorized node performs a denial of service (Dos) attack on the PCC or the PCE, in which the Dos attack refers to an attack implemented through the denial of providing service. For example, if one subscriber sends a great amount of unwanted data packets to sina, the chances of the requests of the subscribers intending to get access to sina may be neglected as compared with the data packets sent from the subscriber, in this manner, the requests of other subscribers may be submerged in the attack packets of the subscriber, which is a typical Dos attack.

The unauthorized node refers to the node which is not authorized and cannot be trusted, and the authorized node refers to the node which is authorized and can be trusted.

Therefore, a security mechanism is required to ensure the communication security between the PCC and the PCE, in the PCEP, many methods such as a TCP Message Digest5 (TCP MD5) signature, and Internet protocol of security (IPSec)

encryption are adopted to ensure the communication security between the PCC and the PCE, to prevent the PCE and the PCC from being pretended, and relief the Dos attack in a certain degree. Meanwhile, other security mechanisms are proposed to protect the PCC-PCE communication, for example, the PCE performs an access authentication on the PCC.

Thereof, it is necessary to negotiate between the PCC and the PCE which security mechanism is adopted between the PCC and the PCE and whether the security mechanism is required or not, so as to determine the security mechanism of the communication between the PCC and the PCE. However, during the process of realizing the present invention, the inventor finds that presently the mechanism for negotiating various security capabilities does not exist in the PCEP or the PCED.

In addition, for whether the security mechanism is adopted or not between the PCC and the PCE, whether a TCP MD5 signature mechanism is adopted or not, and whether the IPSec encryption or other security mechanism is performed on the packets between the PCC and the PCE, presently only the static configuration method is adopted. In the static configuration mode, after the PCC discovers and selects one or more PCEs as the path computation server, the security mechanism between the PCC and the PCE should be statically configured one by one.

During the process of realizing the present invention, the inventor finds that the disadvantage of the static configuration of the security mechanism between the PCC and the PCE is that the configuration is rather heavy and complicated.

SUMMARY

Embodiments of the present invention are directed to a method and a network system for negotiating a security capability between a PCC and a PCE. In the embodiments of the present invention, negotiation of PCC-PCE and PCC-PCC may be performed by sending a packet carrying security policy capability information, thereby greatly simplifying the security policy configuration of PCC-PCE and PCE-PCE, and simplifying the complexity in PCE deployment.

The embodiments of the present invention provide a method for negotiating a security capability between a PCC and a PCE which includes.

Receiving, by the PCC, a packet carrying security policy capability information sent from the PCE; and acquiring, by the PCC, a security policy capability supported or required by the PCE or a security policy capability supported by both of the PCE and the PCC from the packet.

The embodiments of the present invention further provide a network system for negotiating a security capability between a PCC and a PCE which includes at least one PCE and at least one PCC.

The PCE is adapted to send a packet carrying security policy capability information to the PCC.

The PCC is adapted to acquire a security policy capability supported or required by the PCE or the security policy capability supported by both of the PCE and the PCC after receiving the packet, so as to perform a connection or a communication between the PCC and the PCE according to the acquired security policy capability.

In the embodiments of the present invention, the negotiation of PCC-PCE and PCC-PCC may be performed by sending the packet carrying the security policy capability information, thereby greatly simplifying the security policy configuration between PCC and PCE, or between PCE and PCE, and simplifying the complexity in PCE deployment.

DETAILED DESCRIPTION

Figure 1:
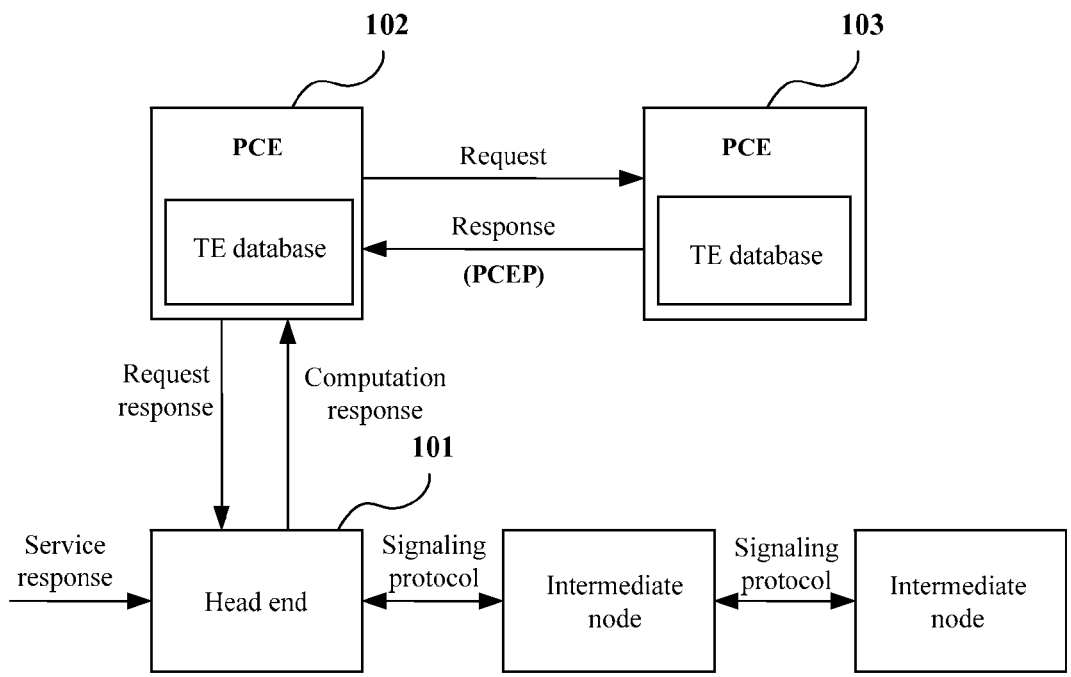
FIG. 1 is a schematic view of a TE path computation implemented together by a plurality of PCEs.

In order to have a further understanding of objectives, technical solutions, and efficacies of the present invention, a detailed description is given below with embodiments and accompanying drawings. Here, the schematic embodiment and the description thereof of the present invention are adapted to given an explanation of the present invention without limiting the present invention.

Embodiments of the present invention provide a method and a network system for negotiating a security capability between a PCC and a PCE. A detailed description of the embodiments of the present invention is given below with the accompanying drawings.

The present invention provides a method for negotiating a security capability between a PCC and a PCE, which includes the steps as follows. The PCE sends a packet carrying security policy capability information to the PCC. After receiving the packet, the PCC acquires a security policy capability supported or required by the PCE or a security policy capability supported by both of the PCE and the PCC.

It may be known from the above embodiment that negotiation of PCC-PCE and PCC-PCC may be performed by sending the packet carrying the security policy capability information, thereby greatly simplifying the security policy configuration of the PCC-PCE and PCC-PCC, and simplifying the complexity in PCE deployment.

In this embodiment, the security policy capability information carried in the PCED includes one or more information about whether to enable a security mechanism or not, whether to adopt a TCP MD5 signature option or not, whether to encrypt the packet between the PCC and the PCE by adopting an IPSec or not, and whether to require performing authentication between the PCC and the PCE or not.

The security policy capability information carried in the PCEP includes the information whether to encrypt the packet between the PCC and the PCE by adopting the IPSec or not, and/or whether to require performing authentication between the PCC and the PCE or not.

The PCC in the embodiments of the present invention is the PCC in broad sense. In certain situations, the PCE may also be the PCC. For example, when it intends to compute a cross-domain path, the path computation may be performed by a plurality of PCEs; one PCE computes a section of the path. However, the PCC, serving as an initiator of the path computation, may send the path computation request to a first PCE. If the first PCE cannot independently implement the whole path computation, the first PCE requests other PCEs to assist the path computation, and here, the first PCE sends the path computation request to other PCEs serving as a PCC to other PCEs, so as to implement the path computation. In the above situation, the negotiation of the security capability between the PCC and the PCE is the negotiation of the security capability between the PCE and another PCE.

In the embodiments of the present invention, the PCED and the PCEP protocols are extended, that is, the security policy capability information is carried in a PCED or a PCEP relevant packet, thereby realizing the dynamic negotiation of the communication security policy between the PCC and the PCE.

For example, the PCED and the PCEP respectively carry the security policy capability information, and the detailed description of the method of the present invention is given below.

First Embodiment

The detailed description of the method for negotiating the security capability of the present invention is given below by taking the PCED carrying the security policy capability information and the PCEP carrying the security policy capability information as examples.

Figure 3:
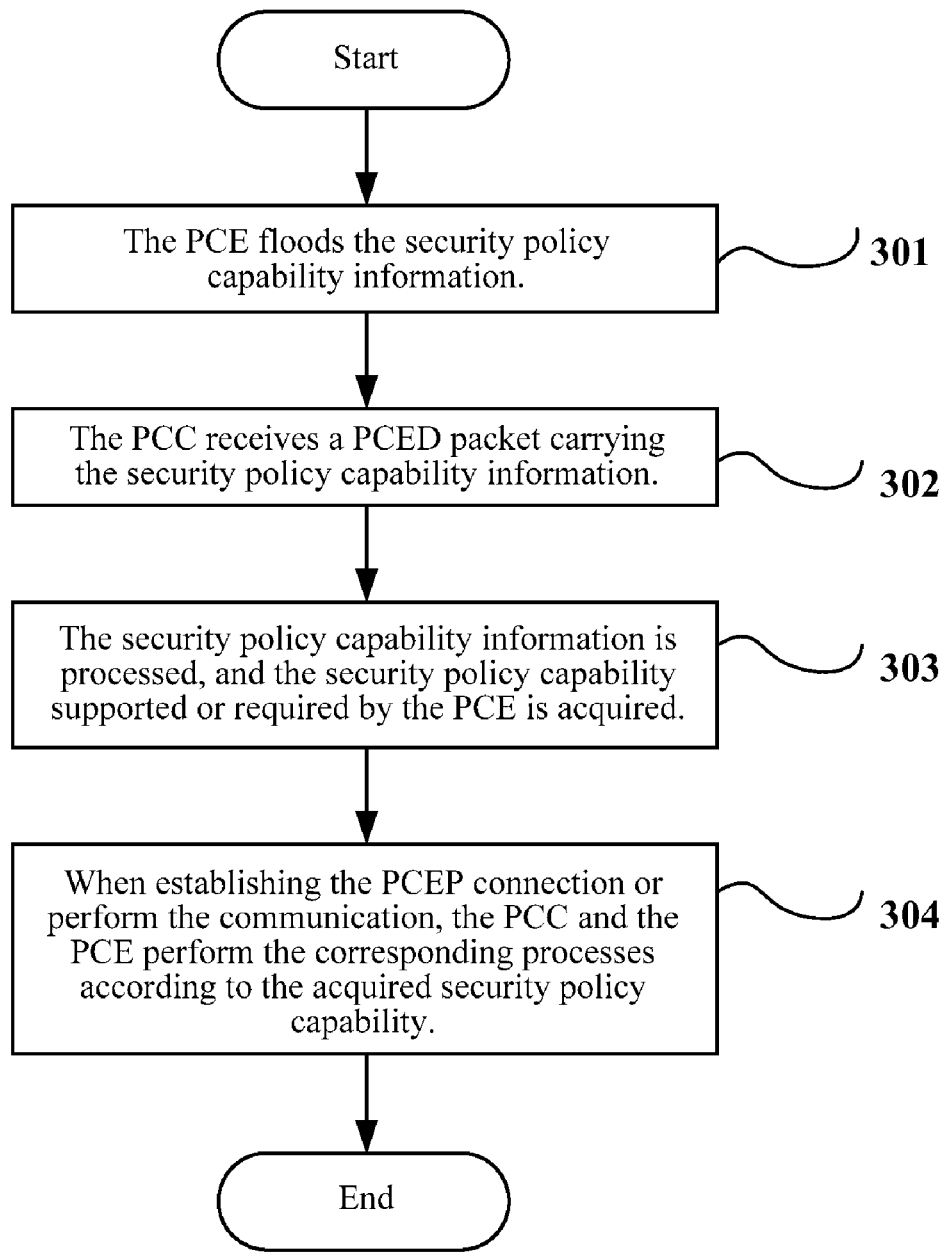
FIG. 3 is a flow chart of a method for negotiating the security capability through a PCED according to a first embodiment of the present invention.

Referring to FIG. 3, when a PCED packet carries the security policy capability information, during an automatic discovery stage of the PCE, the method for negotiating the security capability between the PCC and the PCE through the security policy capability information carried in the PCED packet includes the steps as follows.

In Step 301, the PCE floods the security policy capability information.

In this embodiment, when the PCE floods the relevant information thereof, the PCE determines whether to flood the security policy capability information through the PCED protocol according to the relevant configuration and policy thereof.

For example, if the PCE intends that the TCP MD5 signature option is adopted when establishing the PCEP connection with the PCC, that is, the security policy capability adopts the TCP MD5, the PCE adds the requirement to the security policy notification. Other situations are similar to the above situation, and are not described here.

In addition, for certain PCCs not requiring the security policy, for example, an authorized PCC, the PCE does not flood the security policy capability information according to the practical situation.

In addition, the flooding of the relevant information by the PCE refers to that the PCE generally floods the location information, the compute capability, the computation scope, and other information thereof to one routing domain through the PCED protocol (the OSPF or the ISIS protocol extension), and the routing domain may be one routing area (area/level) or a whole routing autonomous system (AS).

If the PCE determines not to flood the security policy capability information, subsequently the security policy is not adopted when the PCC and the PCE establish the PCEP connection or perform the communication.

In Step 302, the PCC receives a PCED packet carrying the security policy capability information.

In Step 303, a security policy capability supported or required by the PCE is acquired.

Particularly, the PCC resolves the PCED packet, so as to obtain the security policy capability supported or required by the PCE through resolution.

Optionally, the security policy capability obtained through resolution may be saved.

In the above embodiment, the object of the resolution is to extract the security policy capability from the PCED packet.

In this embodiment, by analyzing the relevant field and the flag bit in the PCED packet, the security policy capability supported or required by the PCE is obtained through resolution, in which different fields and different flags represent different security policy capabilities.

In Step 304, when the PCC intends to establish the PCEP connection or perform the communication with the PCE, the PCC selects one or more security policies according to the acquired security policy capability, so as to establish the PCEP connection or perform the communication with the PCE. That is to say, the PCC selects the corresponding security policy according to the security policy supporting situation or requirement of the PCE, so as to establish the PCEP connection or perform the communication with the PCE.

For example, if in the security policy capability information, it is assigned to adopt the TCP MD5 signature option, when the PCC establishes the connection with the PCE, the encryption need to be performed through the TCP MD5 signature option.

If in the security policy capability information, it is assigned to encrypt the packet between the PCC and the PCE by adopting the IPSec, when the PCC and the PCE perform the communication, the packet is encrypted through the IPSec.

If in the security policy capability information, it is assigned to require performing the security authentication between the PCC and the PCE, before the PCC sends a path computation request to the PCE, firstly the security authentication is required performing.

In the above embodiment, the security policy capability information is carried in a PCE capability flag sub-type/length/value (sub-TLV) triplet or a set PCE security policy sub-TLV triplet in the PCED packet, but not limited to the above situation, and other manners may be adopted.

It may be known from the above embodiment that the security policy capability information is carried in the PCED packet, thereby simplifying the security policy configuration of PCC-PCE and PCE-PCE, so that the configuration becomes flexible and easy to be modified.

Second Embodiment

The detailed description of the method for negotiating the security capability of the present invention is given below by taking the PCEP carrying the security policy capability information as an example.

When the PCEP carries the security policy capability information, in this embodiment, when the PCC and the PCE establish the PCEP connection, the security capability between the PCC and the PCE is negotiated through the security policy capability information carried in a PCEP open packet.

The Open packet is a first packet sent to each other when the PCC and the PCE establish the PCEP connection. The Open packet is adapted to switch various capability parameters between the PCC and the PCE, and then the PCC and the PCE perform the negotiation according to the capability parameter thereof and the capability parameter received from the other part, so as to determine the capability supported by both.

When the security policy capability information is carried by adopting the Open packet, the security policy capability may be carried in an open object relevant flag bit in the Open packet, and may be carried in a new TLV, that is, a security policy capability TLV, introduced to the Open Object, but not limited to the above two situations.

In this embodiment, for detailed description, for example, the Open packets of the PCC and the PCE all carry the security policy capability information by adopting the security policy capability TLV.

Figure 4:
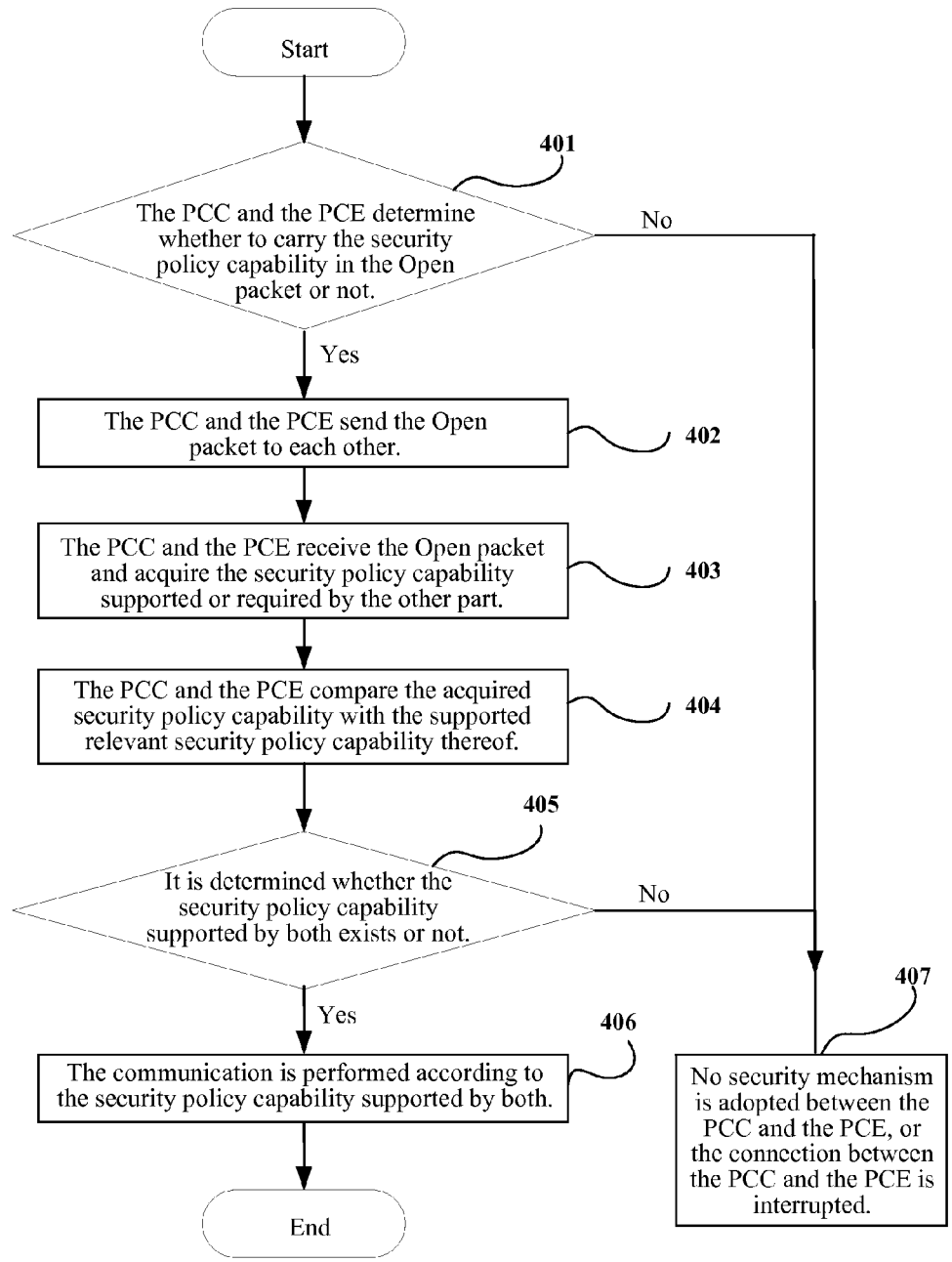
FIG. 4 is a flow chart of the method for negotiating the security capability through a PCEP according to a second embodiment of the present invention.

Referring to FIG. 4, when the security policy capability information is carried in the Open packet of the PCEP, the method for negotiating the security capability between the PCC and the PCE includes the steps as follows.

In Step 401, the PCC and the PCE determine whether to carry the security policy capability in an Open packet or not according to the configurations and policies thereof.

For example, if the PCE configures to require that all the PCC and the PCE must perform the IPsec encryption, the PCE determines to put the requirement of supporting the IPsec encryption in the security policy capability TLV, and sends the security policy capability TLV to the PCC through the Open packet.

For the PCC, the determining manner is the same as that of the PCE, so it is not repeated here.

In Step 402, if a determination result in Step 401 is that both of the PCE and the PCC carry the security policy capability information, the PCE sends a first Open packet carrying the security policy capability information supported or required to the PCC; and the PCC sends a second Open packet carrying the security policy capability information supported or required to the PCE.

In Step 403, after the PCC receives the a first Open packet from the PCE, or the PCE receives the second Open packet sent from the PCC, the PCC and the PCE process the received Open packet, so as to acquire the security policy capability supported or required by the other part. Particularly, the step may be realized through the manner as follows.

The PCC and the PCE resolve the Open packet respectively, so as to acquire the security policy capability supported or required by the other part through resolution, and then save the security policy capability acquired through resolution.

In Step 404, the PCC and the PCE compare the acquired security policy capability with the supported relevant security policy capability thereof.

In Step 405, it is determined whether the security policy capability supported by both of the PCC and the PCE exists or not. If the security policy capability supported by both exists, the negotiation is successful, and Step 406 is performed. If the security policy capability supported by both does not exist, Step 407 is performed.

In Step 406, the communication between the PCC and the PCE is performed according to the security policy capability supported by both. For example, if in the security policy capability, it is assigned to encrypt the packet between the PCC and the PCE by adopting the IPSec, when the PCC and the PCE perform the communication, the packet is encrypted by adopting the IPSec. If in the security policy capability, it is assigned to require to perform the security authentication between the PCC and the PCE, before the PCC sends the path computation request to the PCE, firstly the security authentication is required performing.

In Step 407, when the PCC and the PCE performs the communication, it is possible to not adopt any security mechanism. Or the connection between the PCC and the PCE is interrupted, and the PCC and the PCE cannot continuously perform the communication.

In the above embodiment, in Step 401, if the PCC and the PCE determine not to carry the security policy capability information in the Open packet, Step 407 is performed.

The above method is described below by taking the security policy capability assigning to adopt the IPSec as an example.

Firstly, if the PCC and the PCE configures to require that the communication between the PCC and the PCE adopts the IPSec encryption, the PCC and the PCE put the IPSec capability in the security policy capability TLV.

Then, the security policy capability TLV is coded in an Open packet (a first Open packet or a second Open packet) and sent to the other part respectively.

When an Open packet carrying the security policy capability information is received, the security policy capability information is resolved, so as to obtain the security policy capability acquired by the PCE or the PCC through resolution, and the security policy capability acquired by the PCE or the PCC is then saved.

Finally, the security policy capability acquired by the PCE or the PCC is compared with the supported security policy capability thereof, so as to determine whether the security policy capability supported by both exists or not, that is, to determine whether to support the IPSec encryption. If the security policy capability supported by both exists, the negotiation is successful, and the subsequent communication between the PCC and the PCE is encrypted according to the IPsec.

If in the security policy capability, it is assigned to require performing the security authentication between the PCC and the PCE, before the PCC sends the path computation request to the PCE, the security authentication is firstly required performing. The detailed flow is similar to the above mentioned process, so it is not repeated here.

In the above embodiment, the PCC and the PCE carry the same IPSec capability, and the PCC and the PCE configure to require that the communication between the PCC and the PCE adopts the IPSec encryption. Therefore, the determination result is that the security policy capability supported by both exists, and the negotiation is successful.

If the PCC and the PCE carry different security policy capabilities, for example, the PCC configure to require that the communication between the PCC and the PCE adopts the IPSec encryption, and the PCC carries the IPSec capability; whereas the PCE configures to require that the security authentication is required performing on the communication between the PCC and the PCE, and the PCE carries the capability of performing the security authentication. When the PCC and the PCE send the Open packet to each other, after the packet is processed, the determination result is that the security policy capability supported by both does not exist, the negotiation is unsuccessful, and the PCC and the PCE cannot perform the communication. Or no security mechanism is adopted when the PCC and the PCE perform the communication.

In the above embodiment, the description is made by taking the Open packets of the PCC and the PCE all carrying the security policy capability information as an example. In embodiments of the present invention, the security policy capability information may be separately carried by the Open packet of the PCE or the PCC.

For example, only the PCE configures to require that the communication between the PCC and the PCE adopts the IPSec encryption, and the PCE puts the IPSec capability in the security policy capability TLV. Then, the security policy capability TLV is coded in an Open packet and sent to the PCC.

The Open packet sent from the PCC to the PCE does not carry the security policy capability.

When the PCC receives the Open packet carrying the security policy capability information, the security policy capability information is resolved, so as to acquire the security policy capability supported or required by the PCE through resolution, and the security policy capability acquired by the PCE is saved.

Finally, the PCC compares the acquired security policy capability with the supported security policy capability thereof. Since the configuration of the PCC does not support the IPSec, the determination result is that the security policy capability supported by both does not exist, and the negotiation is not successful. At this time, the connection between the PCC and the PCE is interrupted, or no security mechanism is adopted between the PCC and the PCE.

It may be known from the above mentioned that the security policy capability information is carried by adopting the PCEP packet, thereby greatly simplifying the security policy configuration of PCC-PCE and PCE-PCE, so that the configuration is flexible and easy to be modified.

Third Embodiment

Figure 2:
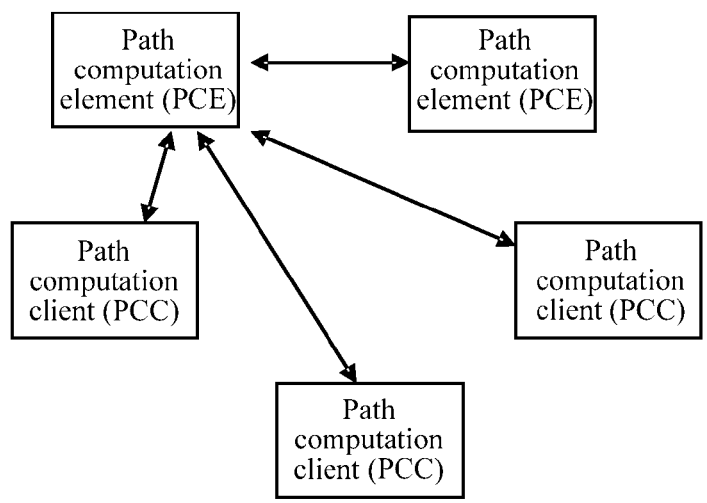
FIG. 2 is a schematic structural view of a network system for negotiating a security capability according to an embodiment of the present invention.

The embodiments of the present invention further provide a network system for negotiating the security capability between a PCC and a PCE. Referring to FIG. 2, the system includes at least one PCE and at least one PCC.

The PCE is adapted to send a packet carrying security policy capability information to the PCC. The PCC is adapted to acquire a security policy capability supported or required by the PCE or the security policy capability supported by both of the PCE and the PCC after receiving the packet, so that the PCC and the PCE perform a connection or a communication according to the acquired security policy capability.

In this embodiment, the packet carrying the security policy capability information is a PCED packet or a PCEP packet.

When the packet is the PCED packet, the acquiring the security policy capability supported or required by the PCE refers to resolving the PCED packet, obtaining the security policy capability supported or required by the PCE through resolution, so as to acquire the security policy capability.

When the packet is the PCEP packet, the PCC is further adapted to send a second PCEP packet to the PCE. After receiving the second packet, the PCE acquires the security policy capability supported by both of the PCE and the PCC, so that the PCC and the PCE perform the communication according to the acquired security policy capability.

It may be known from the above embodiment that the security policy capability information is carried by adopting the PCED packet, thereby greatly simplifying the security policy configuration of PCC-PCE and PCE-PCE, so that the configuration is flexible and easy to be modified.

The network system of the embodiments of the present invention is described in detail below by respectively taking the PCED and the PCEP carrying the security policy capability information as examples.

Fourth Embodiment

The situation of the packet being the PCED packet is described as follows.

The embodiment of the present invention further provides a network system for negotiating the security capability between a PCC and a PCE, which includes at least one PCE and at least one PCC.

The PCE is adapted to send the packet carrying security policy capability information to the PCC. The PCC is adapted to acquire the security policy capability supported or required by the PCE after receiving the packet, so that the PCC and the PCE perform a connection or a communication according to the acquired security policy capability.

In this embodiment, the security policy capability information includes one or more information about whether to enable the security mechanism or not, whether to adopt the TCP MD5 signature option or not, whether to encrypt the packet between the PCC and the PCE by adopting the IPSec or not, and whether to require performing authentication between the PCC and the PCE or not.

The security policy capability information is carried in the PCE capability flag sub-TLV triplet or the set PCE security policy sub-TLV triplet in the PCED packet, but the present invention is not limited to the above situation, and other manners may be adopted.

The negotiating method of the network system for negotiating the security capability of this embodiment is the same as the method in which the PCED packet carries the security policy capability in the first embodiment, so it is not repeated here.

Fifth Embodiment

The situation of the packet being the PCEP packet is described as follows.

The embodiment of the present invention further provides a network system for negotiating the security capability between a PCC and a PCE, which includes at least one PCE and at least one PCC.

The PCE is adapted to send a first PCEP packet carrying security policy capability information to the PCC. The PCC is adapted to acquire the security policy capability supported or required by both of the PCE and the PCC after receiving the first PCEP packet, so that the PCC and the PCE perform the connection or the communication according to the acquired security policy capability.

In this embodiment, the PCC is further adapted to send a second PCEP packet to the PCE. After receiving the second PCEP packet, the PCE is further adapted to acquire the security policy capability supported by both of the PCE and the PCC, so that the PCC and the PCE perform the communication according to the acquired security policy capability.

In this embodiment, the PCEP packets may be Open packets.

The PCC and the PCE determine whether to carry the security policy capability information in the Open packets, and a determination result is that the security policy capability information is carried in the Open packets of the PCC and/or the PCE.

The PCC and the PCE send an Open packet to each other.

When receiving the Open packet, the PCC and the PCE process the received Open packet respectively, so as to acquire the security policy capability acquired by the other part. The PCC and the PCE compare the acquired security policy capability with the supported security policy capability thereof, so as to determine whether the security policy capability supported by both exists or not, and if the security policy capability supported by both exists, the negotiation is successful, and the communication between the PCE and the PCC is performed according to the security policy capability supported by both.

The security policy capability information includes the information about whether to encrypt the packet between the PCC and the PCE by adopting the IPSec or not, and/or whether to require performing authentication between the PCC and the PCE or not.

In this embodiment, the security policy capability information is carried in the PCE capability flag sub-TLV triplet or the set PCE security policy sub-TLV triplet in the PCED packet, but not limited to the above situation, and other manners may be adopted.

It may be known from the above mentioned that the PCC and the PCE may determine whether to carry the security policy capability in the Open packet according to the configurations and the policies thereof. The determination result may be that both of the PCC and the PCE carry the security policy capability, or only the PCC or the PCE carries the security policy capability.

When the PCC and the PCE do not carry the security policy capability, no mechanism is adopted in the communication between the PCC and the PCE, or the communication between the PCC and the PCE is interrupted.

When both of the PCC and the PCE carry the security policy capability, or only the PCC or the PCE carries the security policy capability, the working flow is as described in the second embodiment, and is not repeated here.

Through the above embodiment, the security policy capability information is carried in the PCED packet and the PCEP packet, thereby greatly simplifying the security policy configuration of PCC-PCE and PCE-PCE, so that the configuration is flexible and easy to be modified, so as to simplify the complexity in PCE deployment.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for negotiating a security capability between a path computation client (PCC) and a path computation element (PCE) before the PCC sends a path computation request to the PCE, comprising:
   receiving, by the PCC, a packet carrying security policy capability information for path computation sent from the PCE; and
   acquiring, from the packet by the PCC, at least one of a security policy capability supported by the PCE and a security policy capability required by the PCE, and a security policy capability supported by both of the PCE and the PCC,
   wherein the packet carrying the security policy capability information is one of a path computation element discovery (PCED) packet and a path computation element communication protocol (PCEP) packet;
   when the packet is the PCED packet, the security policy capability information comprises at least one of information about whether to enable a security mechanism or not, information about whether to adopt a transmission control protocol (TCP) message digest5 (TCP MD5) signature option or not, information about whether to encrypt the packet between the PCC and the PCE by adopting an Internet protocol of security (IPSec) or not, and information about whether to require performing authentication between the PCC and the PCE or not; and
   when the packet is the PCEP packet, the security policy capability information comprises at least one of the information about whether to encrypt the packet between the PCC and the PCE by adopting the IPSec or not, and the information about whether to require performing authentication between the PCC and the PCE or not.

2. The method according to claim 1, wherein when the packet is the PCED packet, the method further comprises:
   determining, by the PCE, to flood the security policy capability information through the PCED protocol.

3. The method according to claim 1, wherein when the packet is the PCEP packet, the acquiring the security policy capability supported by both of the PCE and the PCC comprises:
   acquiring, by the PCC, one of the security policy capability supported by the PCE and the security policy capability required by the PCE; and
   comparing, by the PCC, the acquired security policy capability with the security policy capability supported by the PCC, and finding the security policy capability supported by the PCE and the PCC.

4. The method according to claim 1, wherein when the packet is the PCEP packet, the method further comprises:
   sending, by the PCC, a second packet to the PCE; and
   acquiring, by the PCE, the security policy capability supported by both of the PCE and the PCC, after receiving the second packet.

5. The method according to claim 4, wherein the PCEP packet and the second packet are Open packets.

6. The method according to claim 1, wherein when the packet is the PCED packet, the security policy capability information is carried in one of a PCE capability flag sub-type/length/value (sub-TLV) triplet and a PCE security policy sub-TLV triplet in the PCED packet; and
   when the packet is the PCEP packet, the security policy capability information is carried in one of an open object relevant flag bit and a security policy capability type/length/value (TLV) triplet in the open packet.

7. The method according to claim 1, wherein after acquiring at least one of the security policy capability supported by the PCE and the security policy capability required by the PCE, or the security policy capability supported by both of the PCE and the PCC, the method further comprises:
   performing one of a connection and a communication between the PCC and the PCE according to the acquired security policy capability.

8. A network system for negotiating a security capability between a path computation client (PCC) and a path computation element (PCE) before the PCC sends a path computation request to the PCE, comprising at least one PCE and at least one PCC, wherein
   each of the at least one PCE comprises a processor configured to send a packet carrying security policy capability information for path computation to the PCC; and
   each of the at least one PCC comprises a processor configured to acquire at least one of a security policy capability supported by the PCE, a security policy capability required by the PCE, and a security policy capability supported by both of the PCE and the PCC after receiving the packet, so as to perform one of a connection and a communication between the PCC and the PCE according to the acquired security policy capability,
   wherein the packet carrying the security policy capability information is one of a path computation element discovery (PCED) packet and a path computation element communication protocol (PCEP) packet, when the packet is the PCED packet, the security policy capability information comprises at least one of information about whether to enable a security mechanism or not, information about whether to adopt a transmission control protocol (TCP) message digest5 (TCP MD5) signature option or not, information about whether to encrypt the packet between the PCC and the PCE by adopting an Internet protocol of security (IPSec) or not, and information about whether to require performing authentication between the PCC and the PCE or not; and when the packet is the PCEP packet, the security policy capability information comprises at least one of the information about whether to encrypt the packet between the PCC and the PCE by adopting the IPSec or not, and the information about whether to require performing authentication between the PCC and the PCE or not.

9. The network system according to claim 8, wherein when the packet is the PCED packet, the PCE is further configured to determine whether to flood the security policy capability information through the PCED protocol or not.

10. The network system according to claim 8, wherein when the packet is the PCEP packet, the PCC is further configured to compare the security policy capability acquired with the security policy capability supported by the PCC to find the security policy capability supported by both of the PCE and the PCC.

11. The network system according to claim 8, wherein when the packet is the PCEP packet, the PCE is further configured to receive a second packet sent by the PCC, and acquire the security policy capability supported by both of the PCE and the PCC, after receiving the second packet.

12. The network system according to claim 11, wherein the PCEP packet and the second packet are Open packets.

* * * * *